United States Patent
Ueda

(10) Patent No.: US 10,169,015 B2
(45) Date of Patent: *Jan. 1, 2019

(54) COMPACT DATA MARSHALLER GENERATION

(71) Applicant: INTERNATIONAL BUSINESS MACHINES CORPORATION, Armonk, NY (US)

(72) Inventor: Yohei Ueda, Chiba (JP)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/790,862

(22) Filed: Oct. 23, 2017

(65) Prior Publication Data

US 2018/0046443 A1     Feb. 15, 2018

Related U.S. Application Data

(63) Continuation of application No. 15/095,633, filed on Apr. 11, 2016, now Pat. No. 9,904,529, which is a continuation of application No. 14/206,311, filed on Mar. 12, 2014, now Pat. No. 9,348,565.

(51) Int. Cl.
  *G06F 9/44*   (2018.01)
  *G06F 8/51*   (2018.01)
  *G06F 8/40*   (2018.01)

(52) U.S. Cl.
  CPC . *G06F 8/51* (2013.01); *G06F 8/40* (2013.01)

(58) Field of Classification Search
  None
  See application file for complete search history.

(56) References Cited

U.S. PATENT DOCUMENTS

| | | | |
|---|---|---|---|
| 7,333,979 B2 | 2/2008 | Kobayashi et al. | |
| 8,495,659 B1* | 7/2013 | Chacko | G06F 9/465 719/316 |
| 2004/0111464 A1* | 6/2004 | Ho | H04L 29/06 709/203 |
| 2009/0313597 A1* | 12/2009 | Rathbone | G06F 8/33 717/100 |

(Continued)

FOREIGN PATENT DOCUMENTS

| | | |
|---|---|---|
| JP | 10-040086 | 2/1998 |
| JP | 2004-206456 | 7/2004 |
| JP | 2005078650 | 3/2005 |

OTHER PUBLICATIONS

List of IBM Patents or Patent Applications Treated as Related dated Oct. 23, 2017, 2 pages.

(Continued)

*Primary Examiner* — Insun Kang
(74) *Attorney, Agent, or Firm* — Tutunjian & Bitetto, P.C.; Vazken Alexanian

(57) ABSTRACT

A method for compact data marshaller generation includes determining a plurality of data types having a same memory layout from data to be marshalled using a processor, each of the plurality of data types being associated with one or more separate data marshallers. The one or more separate data marshallers are unified to provide a single data marshaller for the plurality of data types for compact data marshaller generation.

17 Claims, 6 Drawing Sheets

(56) References Cited

U.S. PATENT DOCUMENTS

2014/0282391 A1* 9/2014 Doughan .............. G06F 9/4488
 717/116
2015/0007152 A1* 1/2015 Hamman ................ G06F 8/423
 717/146

OTHER PUBLICATIONS

Hericko, M., et al. "Object Serialization Analysis and Comparison in Java and .Net" The 30th SIGPLAN-SIGACT Symposium on Principles of Programming Languages. vol. 38, No. 8. Aug. 2003. pp. 44-54.
Kono, K., et al. "Efficient RMI : Dynamic Specialization of Object Serialization" Proceedings of the 20th International Conference on Distributed Computing Systems. Apr. 2000. (8 Pages).
Opyrchal, L., et al. "Efficient Object Serialization in Java" Proceedings of 19th IEEE International Conference on Distributed Computing Systems Workshops. May-Jun. 1999. (6 Pages).
Park, J., et al. "Specializing the Java Object Serialization Using Partial Evaluation for a Faster RMI" Eigth International Conference on Parallel and Distributed Systems. Jun. 2001. pp. 451-458.
Philippsen, M., et al. "More Efficient Object Serialization" 13th International Parallel Processing Symposium and 10th Symposium on Parallel and Distributed Processing. Workshop on JAVA for Parallel and Distributed Computing. Apr. 1999. pp. 1-15.

* cited by examiner

200

```
01 MEMBER-INFO
   03 MEMBER-NAME
      05   FAMILY-NAME   PIC X(20).
      05   FIRST-NAME    PIC X(20).
   03 MEMBER-CONTACT
      05   ADDRESS       PIC X(40).
      05   PHONE         PIC X(15).
   03 EMERGENCY-CONTACT
      05 03 EMERGENCY-CONTACT-NAME
         07   FAMILY-NAME  PIC X(20).
         07   FIRST-NAME   PIC X(20).
      05   ADDRESS       PIC X(40).
      05   PHONE         PIC X(15).
   03 CONTRACT-INFO
      05   CONTRACT-TYPE    PIC X(1).
      05   CONTRACT-COUNT   PIC 9(1).
   03 MEMBER-AUTHORIZATION
      05 AUTHORIZATION-STATUS  PIC X(1).
      05 AUTHORIZATION-FLAG    PIC 9(1).
```

700

Determining a plurality of data types including data definitions with a same memory layout from data to be marshalled
702

Representing nested data in the data to be marshalled as multiple flat types
704

Defining a new class including a longest common substring of data definitions between two or more of the plurality of classes
706

Unifying the data marshallers for each of the plurality of data types to provide a single data marshaller for the plurality of classes
708

Converting repeating data definitions in a same class into an array
710

Parameterizing column and array lengths
712

Replacing consecutive data definitions that are part of another class with a call to the class
714

FIG. 7

COMPACT DATA MARSHALLER GENERATION

BACKGROUND

Technical Field

The present invention relates to data marshalling, and more particularly to reducing code size of data marshaller code.

Description of the Related Art

Marshalling is the process of transforming the memory representation of an object to a data format suitable for storage or transmission. Since generic, general-purpose data marshallers are slow, it is common practice to prepare specialized marshaller code for each data structure or class. In the case of a COBOL (common business-oriented language) data type, after conversion into JAVA™, a large amount of marshaller code is generated. For this reason, as the number of classes increases, so does the total amount of marshaller code. Since JIT (just in time) compiling of large amounts of marshaller code takes a long time and wastes memory areas for JIT compiled code, most of the marshaller code is executed in slow interpreter mode. As a consequence, due to the shortage of compile time and JIT code area, system performance deteriorates.

SUMMARY

A method for compact data marshaller generation includes determining a plurality of data types having a same memory layout from data to be marshalled using a processor, each of the plurality of data types being associated with one or more separate data marshallers. The one or more separate data marshallers are unified to provide a single data marshaller for the plurality of data types for compact data marshaller generation.

A system for compact data marshaller generation includes a detection module configured to determine a plurality of data types having a same memory layout from data to be marshalled using a processor, each of the plurality of data types being associated with one or more separate data marshallers. A modification module is configured to unify the one or more separate data marshallers to provide a single data marshaller for the plurality of data types for compact data marshaller generation.

These and other features and advantages will become apparent from the following detailed description of illustrative embodiments thereof, which is to be read in connection with the accompanying drawings.

BRIEF DESCRIPTION OF THE DRAWINGS

The disclosure will provide details in the following description of preferred embodiments with reference to the following figures wherein:

FIG. 7 is a block/flow diagram showing a system/method for compact data marshaller generation in accordance with one illustrative embodiment.

DETAILED DESCRIPTION

Figure 1:
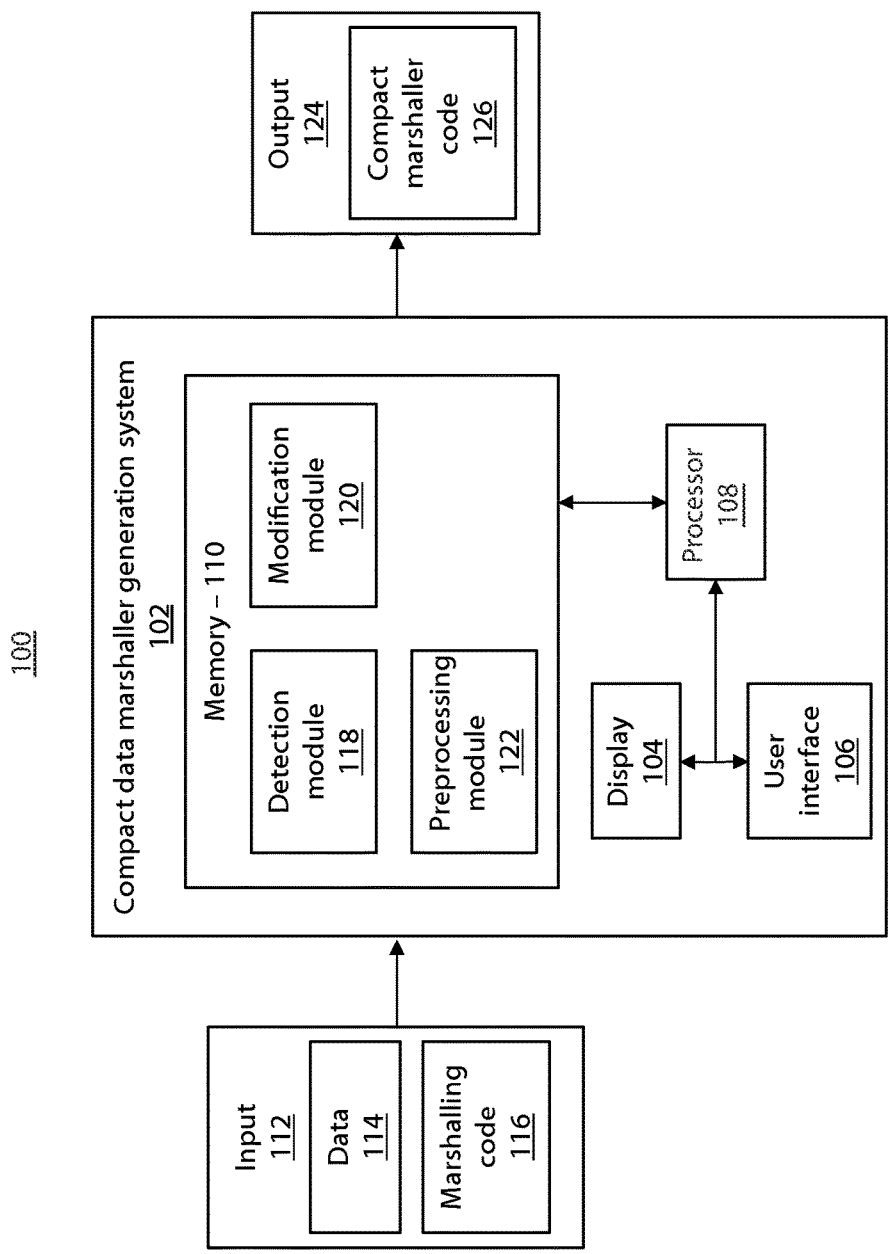
FIG. 1 is a block/flow diagram showing a system/method for compact data marshaller generation in accordance with one illustrative embodiment.

In accordance with the present principles, systems and methods for compact data marshaller generation are provided. A plurality of different data types are determined that have a same memory layout from the data to be marshalled. The plurality of different data types may include primitive types (e.g., Boolean, integer, etc.) or composite types (e.g., classes). The plurality of different data types may have different data definitions. The data marshallers for each of the plurality of different data types are unified into a single data marshaller for the plurality of different data types for compact data marshaller generation. In this way, the code size of data marshallers is reduced. In one embodiment, consecutive data definitions in a first class that are also part of a second class may be replaced with a call to the second class.

In some embodiments, a preprocessing step may be applied where the data to be marshalled is larger than a given threshold size. A longest common substring or sequence of data definitions in two or more classes is identified. A new class is defined including the longest common sequence. The longest common sequence is replaced in the two or more classes with calls to the new class. This may be repeated to reduce marshaller code size to the given threshold size.

The present principles promote seamless integration of legacy and modern systems by eliminating bottlenecks in data communication between, e.g., COBOL (common business-oriented language) and JAVA™ applications. This provides efficient data access from front end open systems to back end COBOL systems. In one experiment, the present principles have been employed to reduce the number of data marshallers from 8,000 to 300 and reduce the total time of data marshalling by 68%.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Reference in the specification to "one embodiment" or "an embodiment" of the present principles, as well as other variations thereof, means that a particular feature, structure, characteristic, and so forth described in connection with the embodiment is included in at least one embodiment of the present principles. Thus, the appearances of the phrase "in one embodiment" or "in an embodiment", as well any other variations, appearing in various places throughout the specification are not necessarily all referring to the same embodiment.

It is to be appreciated that the use of any of the following "/", "and/or", and "at least one of", for example, in the cases of "A/B", "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This may be extended, as readily apparent by one of ordinary skill in this and related arts, for as many items listed.

Referring now to the drawings in which like numerals represent the same or similar elements and initially to FIG. 1, a block/flow diagram showing a system for compact data marshaller generation 100 is depicted in accordance with one illustrative embodiment. The system 100 enables efficient data conversion between, e.g., COBOL (common business-oriented language) and JAVA™ data types by providing compact data marshallers. For example, decimal data structures in COBOL may be converted into integer data structures in JAVA™. Conversion between other types of data may also be employed within the context of the present invention.

The system 100 may include a compact data marshaller generation system or workstation 102. The system 102 preferably includes one or more processors 108 and memory 110 for storing applications, modules and other data. The system 102 may also include one or more displays 104 for viewing. The displays 104 may permit a user to interact with the system 102 and its components and functions. This may be further facilitated by a user interface 106, which may include a mouse, joystick, or any other peripheral or control to permit user interaction with the system 102 and/or its devices. It should be understood that the components and functions of the system 102 may be represented as one or more discrete systems or workstations, or may be integrated as part of a larger system or workstation.

The system 102 may receive input 112, which may include data 114 to be converted (by marshalling or serializing) and marshalling code 116. The data 114 includes data to be converted from one form to another. For example, in a preferred embodiment, the data 114 includes a COBOL data type to be converted into a JAVA™ data type (e.g., decimal into an integer, etc.). Other types of data 114 are also contemplated within the context of the present principles. The data 114 may be defined in a program that includes marshalling code 116 is a same program or in separate discrete programs.

Figures 2, 3:
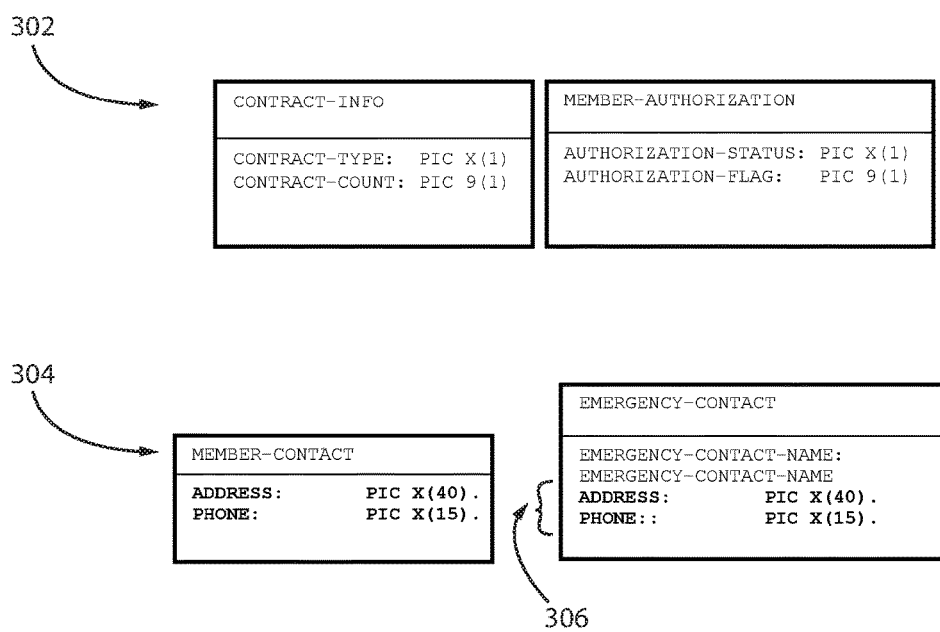
FIG. 2 shows exemplary code including definitions of data to be marshalled in accordance with one illustrative embodiment.
FIG. 3 shows portions of the code of FIG. 2 having a same memory layout in accordance with one illustrative embodiment.

Referring for a moment to FIG. 2, exemplary code 200 is shown in accordance with one illustrative embodiment. The code 200 includes data definitions in COBOL including definitions for data 114. The code 200 includes a number of different data types, including: MEMBER-INFO, MEMBER-NAME, MEMBER-CONTACT, EMERGENCY-CONTACT, EMERGENCY-CONTACT-NAME, CONTRACT-INFO, and MEMBER-AUTHORIZATION.

Referring back to FIG. 1, the detection module 118 is configured to determine a plurality of different data types from the data 114 having data definitions with a same memory layout or format. The data definitions may include different and/or same data definitions. A data type is a classification identifying one of various types of data, such as, e.g., a real-value, integer or Boolean, that determines the possible values for that type, the operations that can be done on values of that type, the meaning of the data, and the way values of that type can be stored.

Preferably, data types are classified into two groups: primitive types and composite types. Examples of primitive types include Booleans, binary integers, decimal integers, floating-point numbers, and strings. In COBOL, programmers need to specify a length for a primitive type such as, e.g., a 4-digit decimal number and a 10-byte string. In JAVA™, the language provides predefined primitive types such as, e.g., 32-bit integers (int) and 64-bit floating-point numbers (double). Primitive types of different lengths are considered different primitive data types.

A composite type defines a data structure containing one or more data fields (e.g., such as a class). Each data field has a name and a data type. A composite can be nested so in this case, the type of a data field is another composite type. Order of data fields of a data structure is important.

Consider the example below. In this example, Data1.value1 and Data2.value2 have the same type (i.e., int). However, Data1 and Data2 are different types since Data1 and Data2 are composite types. In usual typed programming languages, such as, e.g., JAVA™, classes (which are composite types) with different names are considered different data types.

```
class Data1 {
    int value1;
}
class Data2 {
    int value2;
}
```

A same memory layout may include definitions with a same declaration syntax. However, two data types with different declarations may possibly share a same memory layout (as in example 302 in FIG. 3 below).

To determine a same memory layout for primitive types, data lengths are checked. Lengths of data types may be predefined (e.g., as in JAVA™) or defined by the programmer (e.g., as in COBOL). For instance, PIC 9 defines a 1-digit decimal number, PIC 9(4) defines a 4-digit decimal number, PIC 9(10) defines a 10-digit decimal number, etc. The lengths of the number data fields are checked to determine whether they have a same memory layout.

A composite type is represented as an ordered list of data fields. A data field has a name and a type. As such, the memory layout of a composite type is represented as an ordered list of data types of data fields of the composite type. When a composite type is nested, inner composite types are recursively expanded into primitive types. The memory layouts of two composite types are the same if the ordered lists of the primitive types are identical. It should be understood that names of data fields are not significant for comparisons of memory layouts.

Referring to FIG. 3, with continued reference to FIG. 1, illustrative portions of the code 200 are shown having a same memory layout. An example 302 includes the data types CONTRACT-INFO and MEMBER-AUTHORIZATION. The data types in example 302 include different data definitions with a same memory layout. An example 304 includes the data types MEMBER-CONTACT and EMERGENCY-CONTACT. The data types in example 304 include same data definitions with a same memory layout.

In the case of type-safe languages, such as, e.g., JAVA™, applying a single data marshaller code to different data types causes type errors. Consider again the following example:

```
class Data1 {
    int value1;
}
class Data2 {
    int value2;
}
```

These classes, Data1 and Data2, have the same memory layout but Data1 and Data2 are different types. A marshaller for Data1 may be illustrated as follows:

```
class Data1Marshaller {
    static void marshall(Data1 data1, byte buffer[ ]) {
        Util.convertIntToBuffer(data1.value1, buffer);
    }
}
```

Objects of Data1 may be marshalled as follows:

```
Data1 d1 = new Data1( );
d1.value1 = 123;
Data1Marshaller.marshall(d1, buffer);
```

When Data1Marshaller is applied to Data2 objects, JAVA™ compiler reports a type error and stops compiling. To avoid type errors, the detection module 118 may be configured to skip type errors, using mechanisms such as, e.g., sun.misc.Unsafe. Other approaches for skipping type errors are also contemplated.

The modification module 120 is configured to modify the marshalling code 116 to unify or combine data marshallers for the plurality of different data types having a same memory layout into a single data marshaller for the plurality of different types. By unifying, only one of the data marshallers for a same memory layout is selected to be used and the other marshallers are disregarded. The selected marshaller is modified to skip type checking, as discussed above. The marshallers may be unified even if the data types have different data definitions. This can be seen in example 302 of FIG. 3, where the data definitions of CONTRACT-TYPE, CONTRACT-COUNT, AUTHORIZATION-STATUS, and AUTHORIZATION-FLAG are different, but have a same memory layout. The modification module 120 may be employed recursively to thereby provide compact marshaller code 124 as an output 122. The modification module 120 will be described in more detail below with respect to FIG. 4.

For the exemplary code 200 in FIG. 2, the marshallers are unified into the following five sub-data types: MEMBER-INFO, MEMBER-CONTACT, EMERGENCY-CONTACT, CONTRACT-INFO/MEMBER-AUTHORIZATION, and MEMBER-NAME/EMERGENCY-CONTACT-NAME. This results in the reduction of code size of the data marshallers.

In one embodiment, the modification module 120 may be further configured to replace portions of marshaller code for a second class with a call to the marshaller for a first class when consecutive data definitions in the first class are also part of the second class. For example, marshalling of the ADDRESS and PHONE data definitions 306 in the EMERGENCY-CONTACT data type in FIG. 3 is performed by calling the data marshaller of MEMBER-CONTACT.

In an alternate embodiment of the present principles, a common binary may be identified from the generated marshaller code. Here, a binary means a binary code of a data marshaller. A universal de-duplicator of code redundancy among arbitrary binary code may be employed to eliminate redundancy among similar marshaller binary code and reduce their code size.

Figure 4:
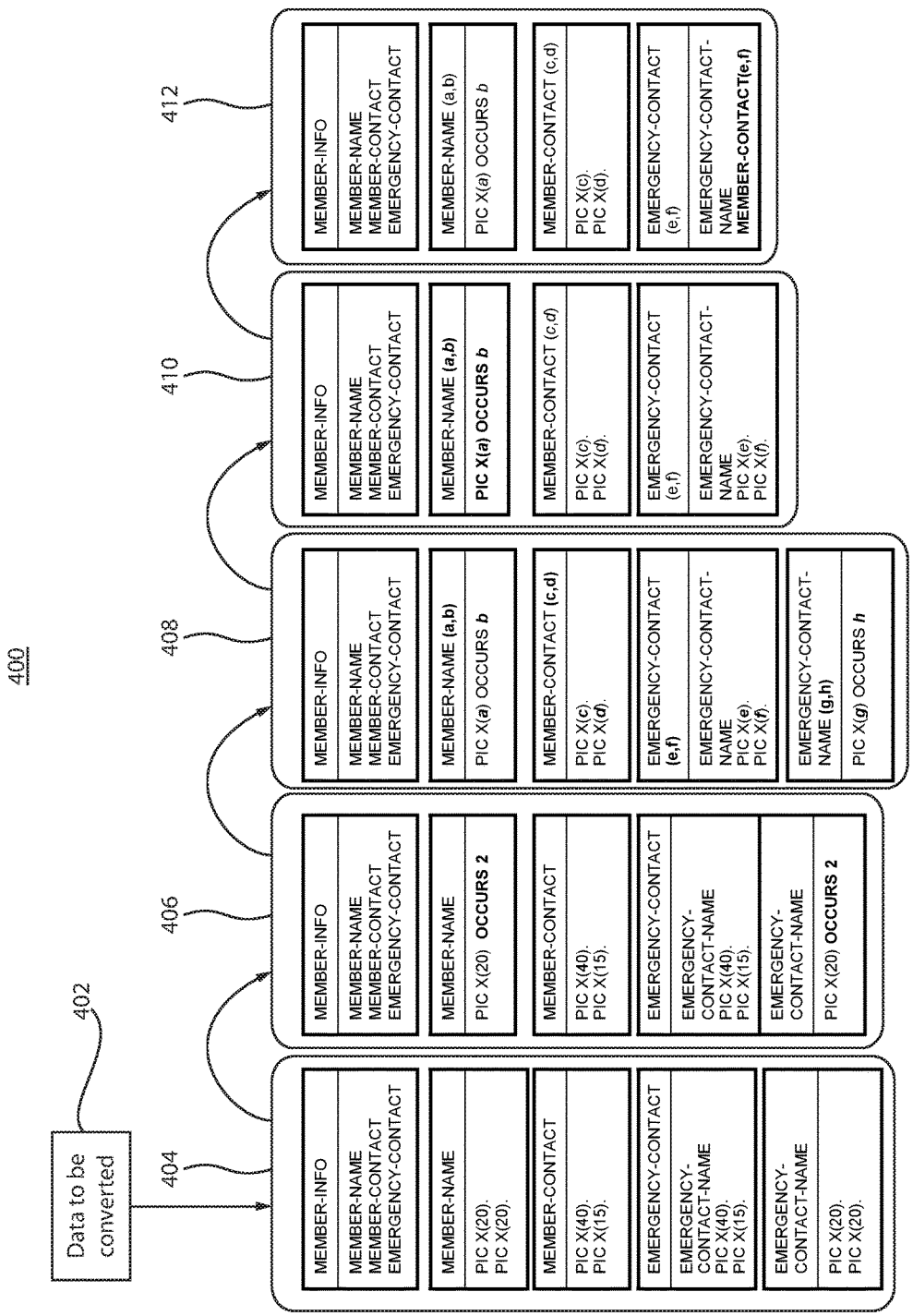
FIG. 4 is a block/flow diagram showing a system/method for unifying data marshallers in accordance with one illustrative embodiment.

Referring now to FIG. 4, a block/flow diagram showing a system/method for unifying data marshallers 400 is illustratively depicted in accordance with one embodiment. In step 402, the data to be converted to another form is read. In the illustrative embodiment 400, the data to be converted includes the exemplary code 200 of FIG. 2. In step 404, if the data to be converted includes nested data, as in the code 200, the data to be converted is represented as multiple flat data and field names are deleted.

In step 406, repeating data fields with a same data type are converted into an array. In the code 200, fields in the type MEMBER-NAME and EMERGENCY-CONTACT-NAME include repeating data fields PIC X(20) and are converted into arrays. In step 408, the column lengths and array lengths are parameterized. Parameterizing includes representing variables of the data field as parameters. In step 410, data types data having a same data representation are unified. In the code 200, the data types MEMBER-NAME and EMERGENCY-CONTACT-NAME are unified since they share the same data representation.

In step 412, consecutive data fields that are part of another data type are replaced with method calls to that other data type. All data types are topologically sorted with subtyping relationship, and then a type that partially matches is searched for every type in ascending order. In the code 200, data fields PIC X(e) and PIC X(f) in EMERGENCY-CONTACT(e, f) is the same as MEMBER-CONTACT(e, f) and are therefore replaced with a method call to MEMBER-CONTACT(e, f).

In a particularly useful embodiment, a preprocessing module 122 may be configured to reduce the size of the data to be converted 114 when the data 114 is larger than a threshold amount. The preprocessing module 122 may be provided for pretreatment of the data 114 before proceeding to the detection module 118 and modification module 120.

Figure 5:
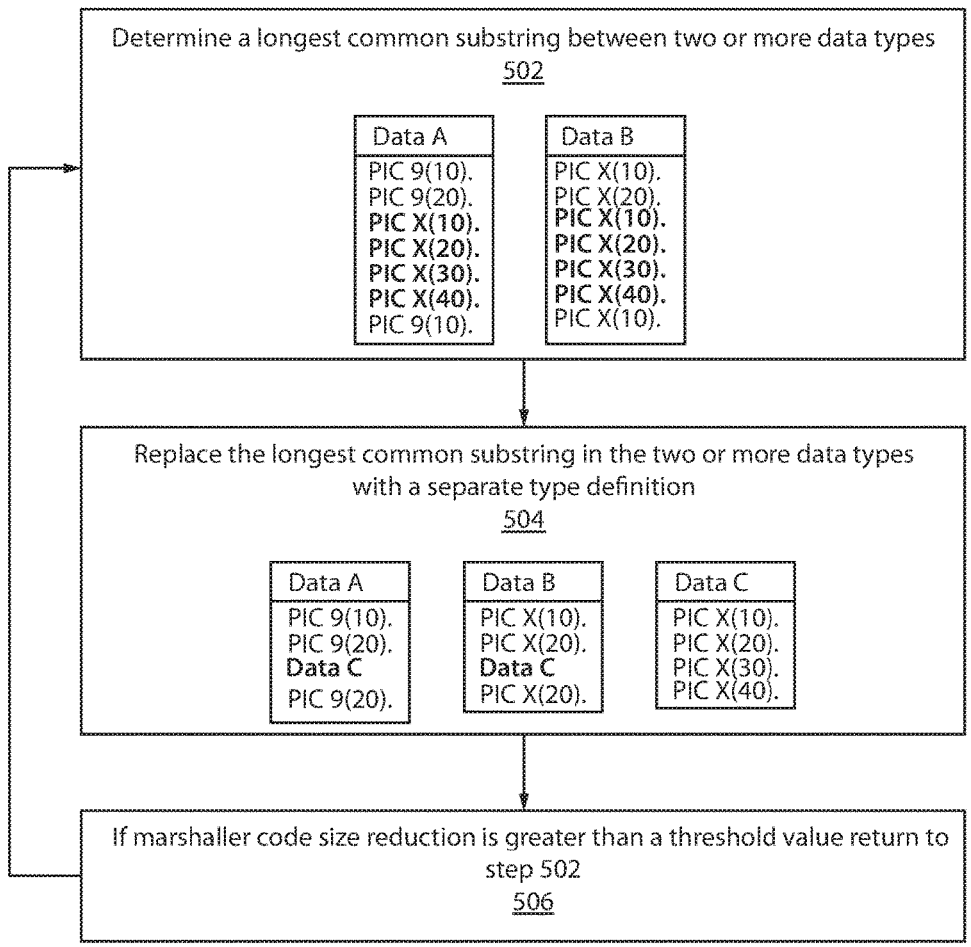
FIG. 5 is a block/flow diagram showing a system/method for reducing marshaller code size in accordance with one illustrative embodiment.

Referring now to FIG. 5, a block/flow diagram showing a system/method for reducing marshaller code size 500 is illustratively depicted in accordance with one embodiment. In block 502, a longest common substring (or sequence) is determined between two or more data types. Classes Data A and Data B, shown illustratively in FIG. 5, includes 7 data definitions each, resulting in 14 total data conversions. The longest common substring may be determined by, e.g., building a generalized suffix tree for the strings, then finding the deepest internal nodes which have leaf nodes from all the strings in the sub-tree below it. Other known methods may also be employed.

In block 504, the longest common substring in the two or more data types is replaced with a newly defined type. In the example in FIG. 5, a data type Data C is defined having data definitions as the longest common substring. When the common sequence is replaced in Data A and Data B with a new type Data C, the total number of data conversions is reduced to 12.

In block 506, if the marshaller code size reduction is greater than a threshold amount, the method returns to block 502. The threshold value may be user defined in accordance with a required level of performance, etc. Once the marshaller code is reduced to the threshold value, the preprocessing completes.

Figure 6:
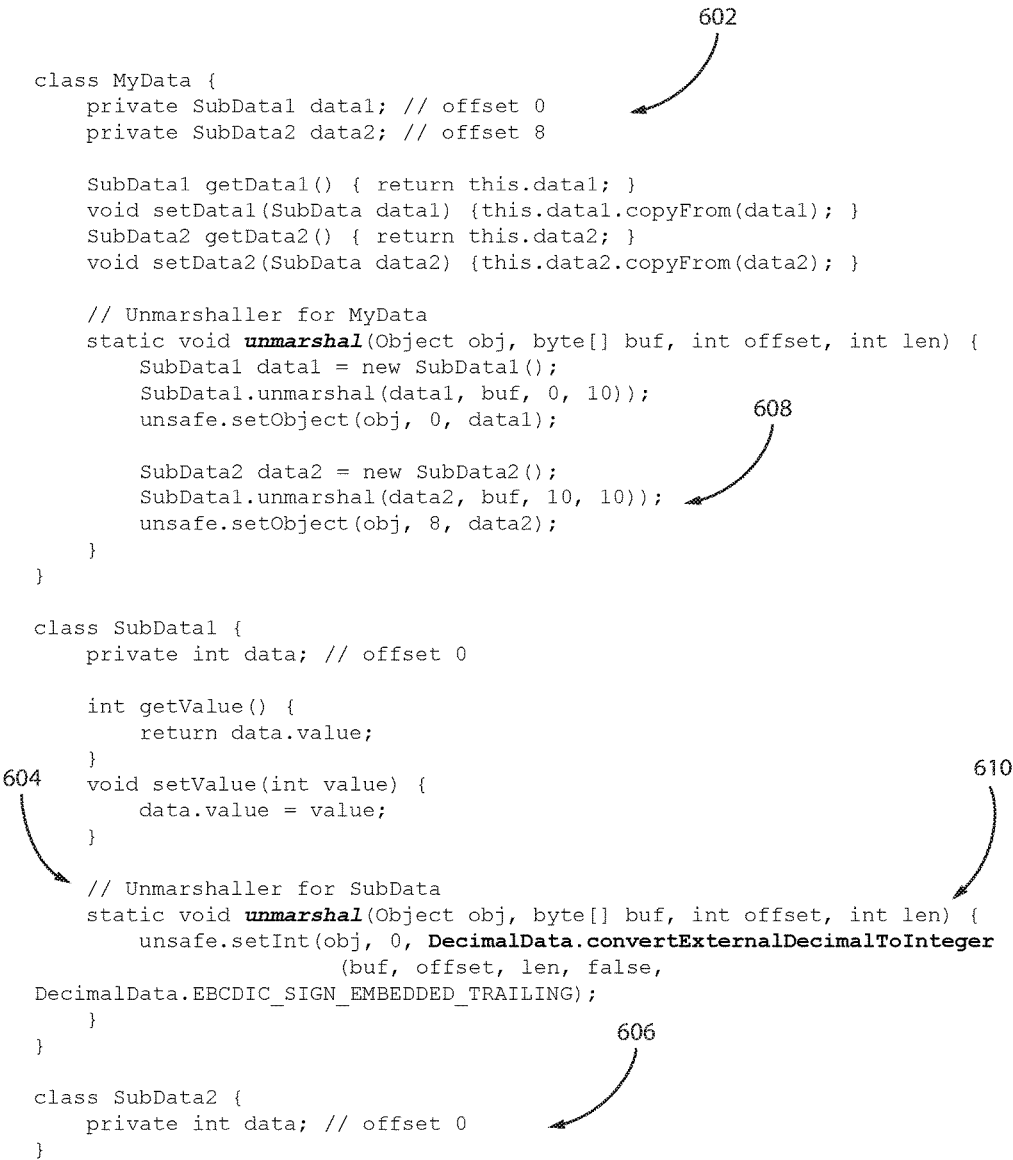
FIG. 6 is exemplary marshaller code in accordance with one illustrative embodiment.

Referring now to FIG. 6, exemplary marshaller code 600 is illustratively depicted in accordance with one illustrative embodiment. The marshaller code 600 provides unmarshalling of SubData1 data 1 and SubData2 data2 from a COBOL data type (i.e., decimal) to a JAVA™ data type (i.e., integer). SubData1 and SubData2 defined at 602 have different data types but a same memory layout. Since SubData1 and SubData2 have a same memory layout, the data marshaller is generated only for SubData1 at 604 and not for SubData2 at 606. The unmarshaller for SubData2 is integrated into the unmarshaller for SubData1 at 608. To avoid type errors, unsafe methods are employed at 610.

The present invention has been experimentally applied to reduce marshallers from 8,000 marshallers to 300 marshallers. The total time of data marshalling is reduced by 68%. Advantageously, the present invention promotes seamless integration of legacy and modern systems by eliminating bottlenecks in data communication between COBOL and JAVA™ applications.

Referring now to FIG. 7, a block/flow diagram showing a method for compact data marshaller generation 700 is illustratively depicted in accordance with one embodiment. In block 702, a plurality of data types having a same memory layout is determined from data to be marshalled. Each of the plurality of data types is associated with one or more separate data marshallers. In one embodiment, the data to be marshalled includes COBOL data to be converted to JAVA™ data. In block 704, nested data in the data to be marshalled is represented as multiple flat types.

In block 706, in a preprocessing step, a new class is defined which includes a longest common substring or sequence of data definitions between two or more of the plurality of classes. The longest common substring of data definitions in two or more of a plurality of classes are replaced with a call to the new class to reduce the number of data conversions. This may be repeated until the marshaller code is reduced to a threshold amount.

In block 708, the data marshallers for each of the plurality of data types are unified to provide a single data marshaller for the plurality of data types. The data marshallers are unified even if the data types have different data definitions. Unifying may include converting repeating data definitions in a same class into an array in block 710 and parameterizing column and array lengths in block 712. In block 714, consecutive data definitions that are part of another class are replaced with a call to the class.

Having described preferred embodiments of a system and method for compact data marshaller generation (which are intended to be illustrative and not limiting), it is noted that modifications and variations can be made by persons skilled in the art in light of the above teachings. It is therefore to be understood that changes may be made in the particular embodiments disclosed which are within the scope of the invention as outlined by the appended claims. Having thus described aspects of the invention, with the details and particularity required by the patent laws, what is claimed and desired protected by Letters Patent is set forth in the appended claims.

What is claimed is:

1. A method for compact data marshaller generation, comprising:
   determining a plurality of data types having a same memory layout from data to be marshalled using a processor, each of the plurality of data types being associated with separate data marshallers; and
   modifying marshalling code to marshal the data by:
      unifying the separate data marshallers to provide a single data marshaller for the plurality of data types for compact data marshaller generation; and
      identifying and replacing consecutive data definitions in a first class of the data types that are also part of a second class of the data types with a call to the second class.

2. The method as recited in claim 1, wherein determining further comprises:
   identifying a longest common sequence of data definitions in two or more classes of the data types;
   defining a new class including the longest common sequence; and
   replacing the longest common sequence in the two or more classes with calls to the new class.

3. The method as recited in claim 1, wherein the determining further comprises representing nested data in the data to be marshalled as multiple flat types.

4. The method as recited in claim 1, wherein the unifying further comprises converting repeating data definitions in a same class into an array.

5. The method as recited in claim 4, wherein the unifying further comprises parameterizing column and array lengths.

6. The method as recited in claim 1, wherein the plurality of data types include different data definitions with the same memory layout.

7. The method as recited in claim 1, wherein the determining further comprises skipping type errors.

8. The method as recited in claim 1, wherein the data to be marshalled includes COBOL data to be converted into JAVA™.

9. A non-transitory computer readable storage medium comprising a computer readable program for compact data marshaller generation, wherein the computer readable program when executed on a computer causes the computer to perform the steps of:
   determining a plurality of data types having a same memory layout from data to be marshalled, each of the plurality of data types being associated with one or more separate data marshallers; and
   modifying marshalling code to marshal the data by:
      unifying the separate data marshallers to provide a single data marshaller for the plurality of data types for compact data marshaller generation; and
      identifying and replacing consecutive data definitions in a first class of the data types that are also part of a second class of the data types with a call to the second class.

10. The non-transitory computer readable storage medium as recited in claim 9, wherein the determining further comprises:
   identifying a longest common sequence of data definitions in two or more classes of the data types;
   defining a new class including the longest common sequence; and
   replacing the longest common sequence in the two or more classes with calls to the new class.

11. A system having a hardware processor for compact data marshaller generation, comprising a program including:
   a detection module configured to determine a plurality of data types having a same memory layout from data to be marshalled using a processor, each of the plurality of data types being associated with separate data marshallers; and
   a modification module configured to modify marshalling code to marshal the data by:
      unifying the separate data marshallers to provide a single data marshaller for the plurality of data types for compact data marshaller generation and identifying and replacing consecutive data definitions in a first class of the data types that are also part of a second class of the data types with a call to the second class.

12. The system as recited in claim 11, wherein the detection module is further configured to:
   identify a longest common sequence of data definitions in two or more classes of the data types;
   define a new class including the longest common sequence; and
   replace the longest common sequence in the two or more classes with calls to the new class.

13. The system as recited in claim 11, wherein the detection module is further configured to represent nested data in the data to be marshalled as multiple flat types.

14. The system as recited in claim 11, wherein the modification module is further configured to convert repeating data definitions in a same class into an array.

15. The system as recited in claim 14, wherein the modification module is further configured to parameterize column and array lengths.

16. The system as recited in claim 11, wherein the plurality of data types includes different data definitions with the same memory layout.

17. The system as recited in claim 11, wherein the detection module is further configured to skip type errors.

* * * * *